US012576840B2

(12) United States Patent　　　　　(10) Patent No.:　US 12,576,840 B2
Naito　　　　　　　　　　　　　　　　　　(45) Date of Patent:　　Mar. 17, 2026

(54) VEHICLE CONTROL DEVICE

(71) Applicant: HITACHI ASTEMO, LTD.,
　　　　　　　Hitachinaka (JP)

(72) Inventor: Daiki Naito, Tokyo (JP)

(73) Assignee: HITACHI ASTEMO, LTD.,
　　　　　　　Hitachinaka (JP)

( * ) Notice:　Subject to any disclaimer, the term of this
　　　　　　　patent is extended or adjusted under 35
　　　　　　　U.S.C. 154(b) by 117 days.

(21) Appl. No.:　　18/553,619

(22) PCT Filed:　　Feb. 28, 2022

(86) PCT No.:　　　PCT/JP2022/008419
　　　§ 371 (c)(1),
　　　(2) Date:　　　Oct. 2, 2023

(87) PCT Pub. No.: WO2022/239388
　　　PCT Pub. Date: Nov. 17, 2022

(65)　　　　　　Prior Publication Data
　　　US 2024/0182029 A1　　Jun. 6, 2024

(30)　　　Foreign Application Priority Data

May 13, 2021　(JP) ................................. 2021-081505

(51) Int. Cl.
　　　*B60W 30/14*　　　(2006.01)
　　　*B60W 30/10*　　　(2006.01)
(52) U.S. Cl.
　　　CPC .......... *B60W 30/143* (2013.01); *B60W 30/10*
　　　　　　　　　　　　　　　　　　　　　　(2013.01)
(58) Field of Classification Search
　　　CPC ............... B60W 30/143; B60W 30/10; B60W
　　　　　　　　　　　　　2552/30; B60W 2720/10;
　　　　　　　　　(Continued)

(56)　　　　　　References Cited

U.S. PATENT DOCUMENTS

2002/0087255 A1* 7/2002 Jindo ................. B60K 31/0008
　　　　　　　　　　　　　　　　　　　　　　　340/436
2005/0187698 A1* 8/2005 Arai ................... B60W 50/0097
　　　　　　　　　　　　　　　　　　　　　　　340/436
　　　　　　　　　　　　(Continued)

FOREIGN PATENT DOCUMENTS

JP　　　2003-327011 A　　11/2003
JP　　　2007-008332 A　　1/2007

OTHER PUBLICATIONS

International Search Report with English Translation and Written
Opinion of International Patent Application No. PCT/JP2022/
008419 dated Apr. 5, 2022 (8 pages).

*Primary Examiner* — Abby Lin
*Assistant Examiner* — Kayla R Doros
(74) *Attorney, Agent, or Firm* — Foley & Lardner LLP

(57)　　　　　　ABSTRACT

A vehicle control device can perform control for causing a
vehicle to travel along a target trajectory at a target vehicle
speed. The vehicle control device can include at least one
processor configured to: determine whether or not the
vehicle is in a deviated state in which the vehicle deviates
from the target trajectory, calculate, when the vehicle is
determined to be in the deviated state, a suppression amount
by which the target vehicle speed is decreased based on a
deviation amount indicating the deviated state, maintain a
hold value at a maximum value of the suppression amount
and suppress the target vehicle speed using the hold value,
and decrease the hold value of the suppression amount at a
predetermined speed when the vehicle returns from the
deviated state to the target trajectory and a preset release
condition is satisfied.

6 Claims, 9 Drawing Sheets

(58) Field of Classification Search
CPC .......... B60W 2720/103; B60W 30/14; B60W
30/146; B60W 30/18145; B60W 60/0053;
B60W 60/0059; B60W 30/12; B60W
40/072; B60W 2510/081; B60W 2520/14;
B60W 2720/14; B60W 40/114; B60W
40/105; B60W 60/0051; B60W 2520/10;
B60W 2520/125; B60W 2540/18; B60T
8/17557; B60T 2201/08; B60T 13/662;
B60T 8/1755; B62D 6/003; B62D
15/025; B62D 6/00; G05D 1/0223; B60L
2240/22; B60L 2240/12; G01C 21/26
See application file for complete search history.

(56) References Cited

U.S. PATENT DOCUMENTS

| | | | | |
|---|---|---|---|---|
| 2007/0255474 A1* | 11/2007 | Hayakawa | ............ | B60W 30/12 |
| | | | | 701/70 |
| 2018/0297594 A1* | 10/2018 | Takahashi | ............ | G05D 1/0891 |
| 2019/0025825 A1* | 1/2019 | Takahama | ............. | B60W 30/16 |
| 2020/0341470 A1* | 10/2020 | Maeda | ............... | G01C 21/3822 |
| 2023/0202558 A1* | 6/2023 | Ogata | ................. | B62D 15/025 |

* cited by examiner

$r_{tgt}$ : TURNING RADIUS OF TARGET TRAJECTORY
eY : DEVIATION AMOUNT FROM TARGET TRAJECTORY
N : TURNING DETERMINATION THRESHOLD
M : DEVIATION DETERMINATION THRESHOLD

START

301
$r_{tgt}$<N ?

NO

YES 302
eY>M ?

NO

YES
303
HOLD SUPPRESSION AMOUNT

304
SUPPRESSION AMOUNT
GRADUAL DECREASE PROCESSING

END

FIG. 9

$$V = \sqrt{(\mu \times g \times r)} \qquad ...(1)$$

FIG. 10

$$V \leq \sqrt{(Yg\_t \times r)} \qquad ...(2)$$

FIG. 11

$$VSP_R = \sqrt{\frac{r_{tgt}}{r_{cur}}} VSP_{cur} \qquad \cdots(3)$$

FIG. 12

$$r_{cur} = r_{tgt} + eY \qquad \cdots(4)$$

FIG. 13

$$S = 1 - \frac{VSP_R}{VSP_{tgt}} \qquad \cdots(5)$$

FIG. 14

$$c = \frac{1}{r} \qquad \cdots(6)$$

VEHICLE CONTROL DEVICE

TECHNICAL FIELD

The present invention relates to a vehicle control device.

BACKGROUND ART

Generally, in autonomous driving, a target vehicle speed is a value arbitrarily set by a driver or a speed limit according to regulations, and it is assumed that a vehicle travels on a paved road surface at a predetermined target vehicle speed. Furthermore, in order to improve traveling stability at the time of turning, there are a method of limiting a vehicle speed V based on a road surface frictional force u and a curvature factor r (Expression (1) in FIG. 9), a method of limiting the vehicle speed V based on a maximum lateral acceleration $Yg\_t$ set in advance (Expression (2) in FIG. 10), and the like. By generating the target vehicle speed according to the above methods, followability to a target trajectory during traveling in the common city streets or the like is secured.

However, there is a case where deviation from the target trajectory occurs due to an influence of disturbance that is difficult to predict even with the above methods. As a method for preventing and suppressing the deviation in such a case, the following techniques of PTLs 1 and 2 are disclosed, for example.

PTL 1 discloses a technique for suppressing acceleration and deviation of a vehicle in a case where it is predicted that an own vehicle deviates from a lane or it is determined that the own vehicle deviates from the lane during autonomous traveling. In addition, PTL 2 discloses a technique for changing a target vehicle speed, when a vehicle speed after a deviation prevention device mounted on the own vehicle operates during autonomous traveling is lower than a preset target vehicle speed, to a vehicle speed after lane deviation prevention control, so as to prevent the vehicle from being accelerated again.

CITATION LIST

Patent Literature

PTL 1: JP 2003-327011 A
PTL 2: JP 2007-8332 A

SUMMARY OF INVENTION

Technical Problem

A disturbance that causes a vehicle to deviate out of a target trajectory during curve traveling is mainly occurs when a road surface frictional force is lower than that expected by an autonomous traveling system. Prevention and suppression of the deviation by application of the inventions described in PTLs 1 and 2 when the vehicle deviates from the target trajectory due to an influence of such a disturbance pose the following problems.

In PTL 1, the vehicle speed is restricted and acceleration is restricted when deviation prevention control is performed, and then, when the control is stopped, the vehicle may be accelerated again and deviate again, or acceleration and deceleration may be repeated by the deviation prevention control.

On the other hand, in PTL 2, it is not always possible to return to the target lane with the vehicle speed after the control operation, and a method of restoring the target vehicle speed is not considered, and if the target is continuously set low, there is a possibility that the passenger feels uncomfortable.

In view of the above circumstances, an object of the present invention is to provide a vehicle control device capable of ensuring safety without giving a sense of discomfort to a passenger, by appropriately decreasing a target vehicle speed when a vehicle deviates from a target trajectory in order to prompt the vehicle to return to the target trajectory, and quickly resuming the target vehicle speed to an original speed when the possibility of re-deviation is low.

Solution to Problem

A vehicle control device of the present invention that solves the above problem is a vehicle control device that performs control for causing a vehicle to travel along a target trajectory at a target vehicle speed, the vehicle control device including:

determining whether or not the vehicle is in a deviated state in which the vehicle deviates from the target trajectory;

calculating, when the vehicle is determined to be in the deviated state, a suppression amount by which the target vehicle speed is decreased based on a deviation amount indicating the deviated state;

holding a maximum value of the suppression amount and suppressing the target vehicle speed using a hold value that has been held; and decreasing the hold value of the suppression amount at a predetermined speed when the vehicle returns from the deviated state to the target trajectory and a preset release condition is satisfied.

Advantageous Effects of Invention

According to the present invention, when the vehicle deviates from the target trajectory, the vehicle speed is appropriately suppressed, and when the suppression is unnecessary, the vehicle speed is mildly recovered, so that safe traveling is enabled. Further features related to the present invention will become apparent from the description of the present specification and the accompanying drawings. Problems, configurations, and effects other than those described above will become apparent by the following description of an embodiment.

BRIEF DESCRIPTION OF DRAWINGS

FIG. 1 is a diagram for illustration of a configuration of a system according to the present embodiment.

FIG. 2 is a diagram for illustration of a configuration of a target vehicle speed suppression amount calculation unit.

FIG. 9 is a diagram showing Expression (1).

FIG. 10 is a diagram showing Expression (2).

FIG. 11 is a diagram showing Expression (3).

FIG. 12 is a diagram showing Expression (4).

FIG. 13 is a diagram showing Expression (5).

FIG. 14 is a diagram showing Expression (6).

DESCRIPTION OF EMBODIMENT

Figure 3:
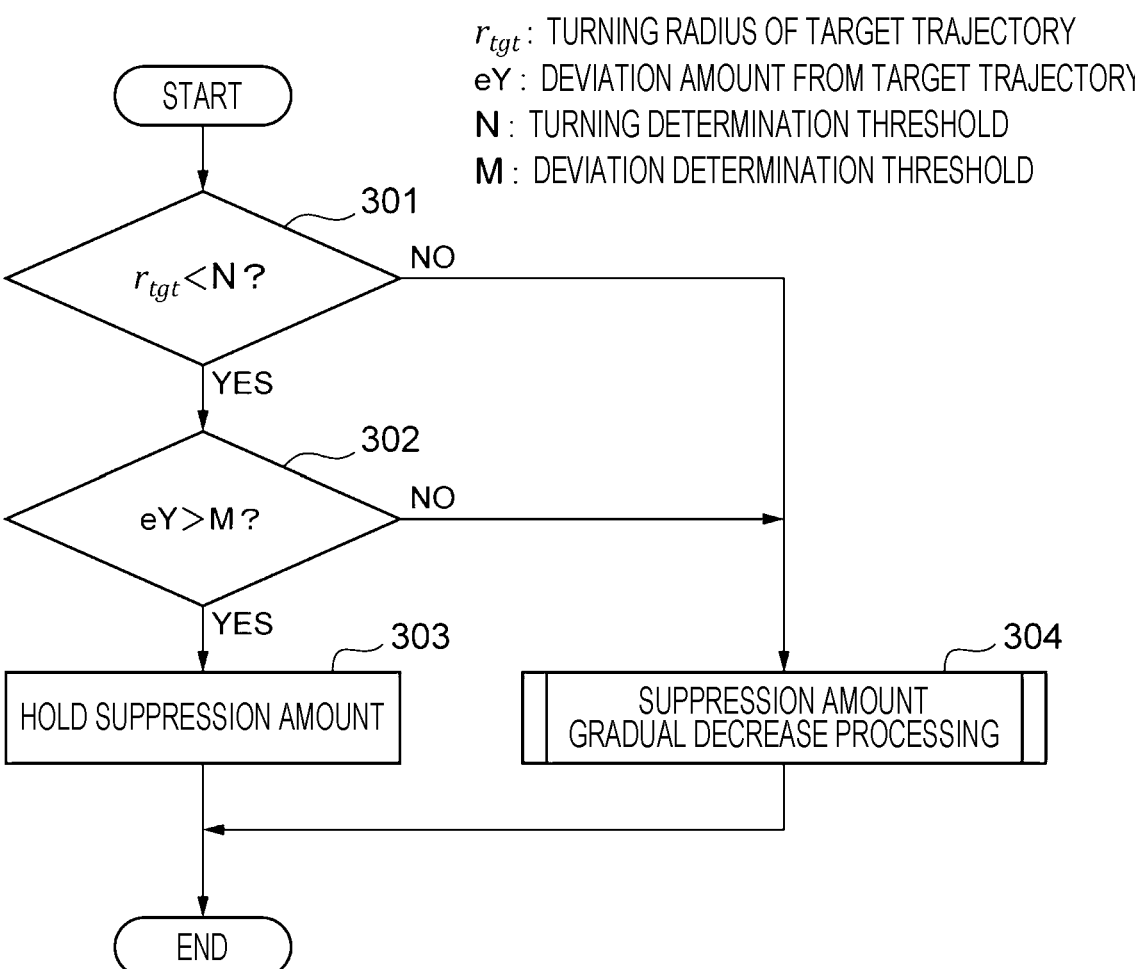
FIG. 3 is a flowchart showing contents of processing of a control necessity determination unit.

Hereinafter, an embodiment of a vehicle control device according to the present invention will be described with reference to the drawings.

Figure 1:
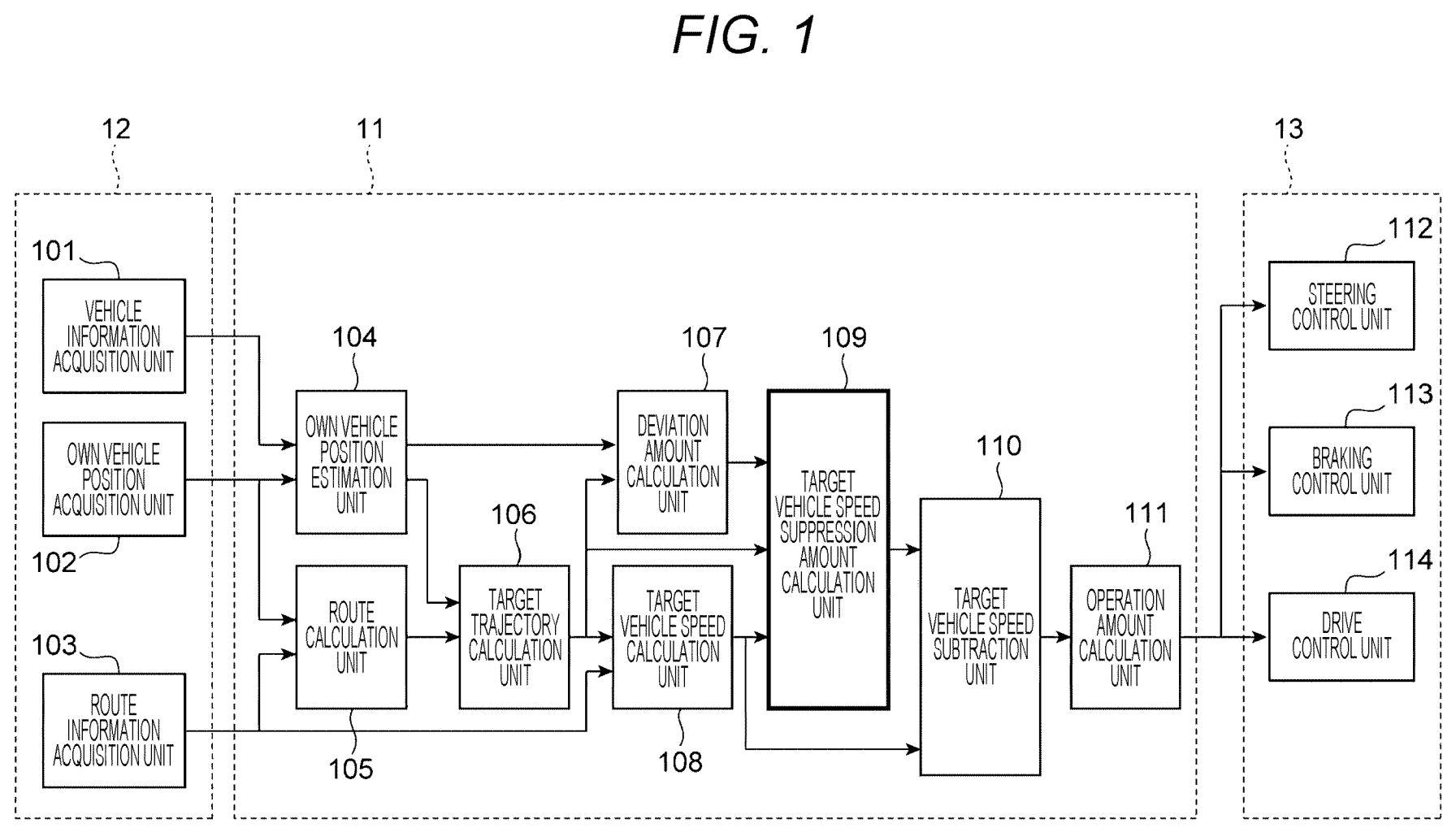

FIG. 1 is a diagram illustrating a schematic configuration of the vehicle control system according to the present embodiment.

A vehicle system is a system for causing a vehicle to autonomously travel or automatically travel along a target trajectory at a target vehicle speed, and manages the target vehicle speed at the time of deviation from the target trajectory. The vehicle system includes an information acquisition unit 12 for various information that acquires information such as a surrounding environment and a state of the vehicle, an ECU 11 mounted on the vehicle, and an actuator 13 of various parts that controls the vehicle based on control signals output from the ECU 11.

The information acquisition unit 12 includes, for example, a vehicle information acquisition unit 101 such as a wheel speed sensor, an acceleration sensor, and a yaw rate sensor, an own vehicle position acquisition unit 102 such as GPS and HD-MAP, and a route information acquisition unit 103 such as NAVI and C2X.

The vehicle information acquisition unit 101 acquires information regarding movement of the vehicle such as a yaw rate and acceleration, information regarding whether or not to execute behavior control such as ABS and ESC, and the like, and outputs these pieces of information to the ECU 11.

The own vehicle position acquisition unit 102 acquires position information of the own vehicle in an absolute coordinate system such as the World Geodetic System, and outputs the position information to an own vehicle position estimation unit 104 and a route calculation unit 105. In addition, in a case where the information of the own vehicle position cannot be acquired from outside, the previous value is held, the vehicle behaves in a manner that it can be determined that the own vehicle position cannot be acquired, such as outputting a specific value, or a signal indicating whether or not the own vehicle position can be acquired is output.

The route information acquisition unit 103 uses NAVI or C2X to acquire a destination of the vehicle, a route to the destination, and traffic information and surrounding information associated with the route, and outputs the information to the route calculation unit 105 and a target vehicle speed calculation unit 108.

The ECU 11 constitutes a vehicle control device, and includes, as internal functions, the own vehicle position estimation unit 104, the route calculation unit 105, a target trajectory calculation unit 106, a deviation amount calculation unit 107, the target vehicle speed calculation unit 108, a target vehicle speed suppression amount calculation unit 109, a target vehicle speed subtraction unit 110, and an operation amount calculation unit 111. In each of these configurations, a part of a software program executed by a microcomputer built in the ECU 11 is specifically expressed by a functional block. The ECU 11 includes hardware such as a CPU and a memory, and a software program executed by the hardware, and realizes these functions by cooperation of the hardware and the software program.

The own vehicle position estimation unit 104 uses an output of the vehicle information acquisition unit 101 and an output of the own vehicle position acquisition unit 102 to estimate the own vehicle position with higher accuracy than the own vehicle position acquisition unit 102. The route calculation unit 105 calculates a travelling route to the destination using the output of the own vehicle position acquisition unit 102 and an output of the route information acquisition unit 103.

The target trajectory calculation unit 106 calculates a target trajectory based on an output of the own vehicle position estimation unit 104 and an output of the route calculation unit 105. The target trajectory calculation unit 106 calculates detailed and continuous position information in the vicinity of the own vehicle as a target trajectory.

The deviation amount calculation unit 107 determines whether the vehicle is in a deviated state in which the vehicle deviates from the target trajectory based on the output of the own vehicle position estimation unit 104 and an output of the target trajectory calculation unit 106, and calculates a deviation amount indicating the deviated state when it is determined that the vehicle is in the deviated state. As the deviation amount, for example, it is possible to use a separation distance between a vehicle center and the target trajectory such as a distance when the vehicle is apart from the target trajectory in the road width direction, or a deviation speed at which the vehicle deviates from the target trajectory calculated by differentiating the separation distance by time.

The target vehicle speed calculation unit 108 calculates the target vehicle speed based on laws and regulations of the road on which the vehicle is traveling, an arbitrary limit value, and map information such as a shape of the target trajectory. The target vehicle speed calculation unit 108 can acquire the map information from a map database included in an in-vehicle navigation device or from an external server by road-to-vehicle communication, for example.

The target vehicle speed suppression amount calculation unit 109 calculates a suppression amount by which the target vehicle speed is suppressed when the vehicle deviates from the target trajectory, based on the target trajectory, the target vehicle speed, and the deviation amount. As the suppression amount, at least one of a speed amount and a rate by which the target vehicle speed of the vehicle is decreased can be used.

When the suppression amount is calculated by the target vehicle speed suppression amount calculation unit 109, the target vehicle speed subtraction unit 110 calculates the target vehicle speed at the time of deviation using the target vehicle speed before deviation and the suppression amount. The target vehicle speed subtraction unit 110 calculates the target vehicle speed at the time of deviation by subtracting the suppression amount from the target vehicle speed before deviation when the suppression amount is the speed, and calculates the target vehicle speed at the time of deviation by multiplying the target vehicle speed before deviation by a rate when the suppression amount is, instead of the speed amount, a rate by which the target vehicle speed is decreased.

When the vehicle does not deviate from the target trajectory, that is, when the suppression amount is not calculated by the target vehicle speed suppression amount calculation unit 109, the target vehicle speed subtraction unit 110 outputs the target vehicle speed calculated by the target vehicle speed calculation unit 108 to the operation amount calculation unit 111 as it is. The operation amount calculation unit 111 calculates an operation amount of each part of the actuator 13 such as a steering control unit 112, a braking control unit 113, and a drive control unit 114 according to the target vehicle speed calculated by the target vehicle speed subtraction unit 110.

Figure 2:
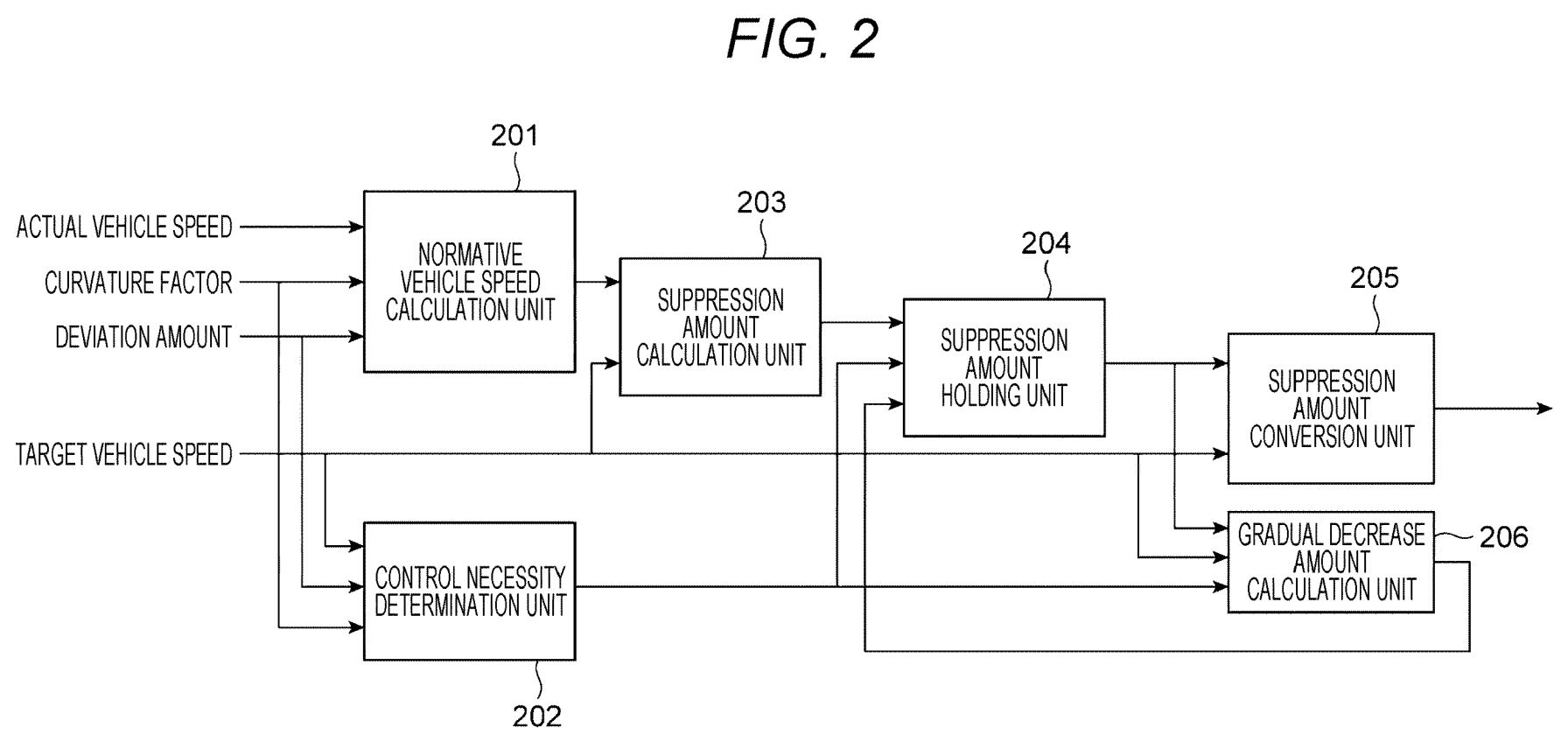

FIG. 2 is a diagram for illustration of a configuration of the target vehicle speed suppression amount calculation unit 109.

The target vehicle speed suppression amount calculation unit 109 includes a normative vehicle speed calculation unit 201, a control necessity determination unit 202, a suppression amount calculation unit 203, a suppression amount holding unit 204, a suppression amount conversion unit 205, and a gradual decrease amount calculation unit 206.

The normative vehicle speed calculation unit 201 calculates a normative vehicle speed $VSP_R$ from an actual vehicle speed, a curvature factor, and a deviation amount of the vehicle. The normative vehicle speed $VSP_R$ is a maximum vehicle speed at which the vehicle can pass without deviating from the target trajectory.

In the present embodiment, Expression (3) shown in FIG. 11 is used as one of methods for calculating the normative vehicle speed $VSP_R$ during turning.

In Expression (3), $VSP_R$ is the normative vehicle speed, $VSP_{cur}$ is the actual vehicle speed, $r_{cur}$ is a turning radius during traveling, and $r_{tgt}$ is a turning radius of the target trajectory.

At this time, the turning radius $r_{cur}$ during traveling is calculated by Expression (4) shown in FIG. 12 using the turning radius $r_{tgt}$ of the target trajectory and a deviation amount eY.

In addition, a threshold may be provided for each of the turning radius $r_{tgt}$ of the target trajectory and the deviation amount eY so as to prevent the suppression control of the target vehicle speed from being performed due to an erroneous operation of the vehicle while traveling on a straight line. In addition, a dead zone for the deviation amount eY may be provided so as to prevent the vehicle from being sensitively operated by the vehicle control and to prevent the ride comfort for a passenger from deteriorating.

In addition, when the vehicle deviates inwardly in the turning with respect to the target trajectory, the turning radius $r_{tgt}$ of the target trajectory becomes larger than the turning radius Your during traveling ($r_{tgt}>r_{cur}$), and the normative vehicle speed $VSP_R$ becomes larger than the actual vehicle speed $VSP_{cur}$ ($VSP_R>VSP_{cur}$). Therefore, there is a possibility that the control is performed to increase the target vehicle speed. Therefore, it is possible to provide a restriction that the normative vehicle speed $VSP_R$ is smaller than the actual vehicle speed $VSP_{cur}$ ($VSP_R<VSP_{cur}$), or to take a prevention measure that it is assumed that the deviation amount eY does not occur when the vehicle deviates inwardly in the turning with respect to the target trajectory.

The suppression amount calculation unit 203 calculates a suppression amount S from the normative vehicle speed $VSP_R$ and the target vehicle speed $VSP_{tgt}$. The suppression amount S can be calculated, as shown in Expression (5) of FIG. 13, by subtracting a rate obtained by dividing the normative vehicle speed $VSP_R$ by the target vehicle speed $VSP_{tgt}$ from 1. Alternatively, instead of the suppression amount S, a suppression amount calculated using a constant standard according to the deviation speed may be used. In this case, the suppression amount increases as the deviation speed increases. In addition, it is possible to calculate the suppression amount based on each of the deviation amount and the deviation speed, and a value that is larger may be used.

The control necessity determination unit 202 determines, based on the target vehicle speed of the vehicle, the curvature factor, and the deviation amount from the target trajectory, the necessity of the present control, that is, whether or not the control for suppressing the target vehicle speed is necessary. A curvature factor c in the present embodiment is a curvature factor of the vehicle trajectory during turning, and can be easily converted to an arbitrary turning radius r by Expression (6) in FIG. 14.

When the control necessity determination unit 202 determines that the control is necessary, the suppression amount holding unit 204 compares the suppression amount S with a hold value Sh of the suppression amount and holds a larger value (maximum value), and gradually decreases the hold value Sh to 0 when the control is not necessary.

The gradual decrease amount calculation unit 206 calculates a gradual decrease amount by which the hold value Sh is gradually decreased based on the hold value Sh, the target vehicle speed, and the determination of necessity of control. For example, the gradual decrease amount calculation unit 206 is provided because in a case where the suppression amount S is held at a rate, when it is desired to recover the target vehicle speed suppressed at an arbitrary acceleration, it is necessary to calculate the gradual decrease amount according to the arbitrary acceleration and the target vehicle speed.

The suppression amount conversion unit 205 converts the hold value into a vehicle speed dimension based on the hold value and the target vehicle speed. The hold value converted into the vehicle speed dimension by the suppression amount conversion unit 205 is output from the target vehicle speed suppression amount calculation unit 109 to the target vehicle speed subtraction unit 110.

FIG. 3 is a flowchart showing contents of processing of the control necessity determination unit in FIG. 2.

The control necessity determination unit 202 executes determination processing shown in the flowchart of FIG. 3 in a program cycle of a predetermined cycle set in advance, for example.

First, it is determined whether the turning radius $r_{tgt}$ of the target trajectory on the road on which the vehicle is currently traveling is smaller than an arbitrary threshold N (S301). When the turning radius $r_{tgt}$ is smaller than the threshold N (YES), it is determined that the vehicle is turning, and then, it is determined whether or not the deviation amount eY is larger than an arbitrary deviation determination threshold M (S302).

When the deviation amount eY is larger than the deviation determination threshold M (YES), the suppression amount is held (S303). Here, processing for holding the maximum value of the suppression amount is performed. Specifically, the suppression amount calculated based on the deviation amount eY is compared with a value of the held suppression amount, and a larger value is held as the hold value Sh. On the other hand, when either of the conditions of S301 and S302 is not satisfied, for example, when the vehicle is not turning or when the deviation amount eY is equal to or less than the threshold M, suppression amount gradual decrease processing of gradually decreasing the hold value Sh is performed (S304).

In the present embodiment, the determination on necessity of the suppression control is made based on the separation distance as the deviation amount, but the determination on necessity may be made based on the deviation speed as the deviation amount, or both the separation distance and the deviation speed may be used and the suppression control may be performed when either exceeds the standard. The deviation speed can be calculated, for example, by differentiating the separation distance by time.

Next, contents of the processing of S304 will be described in detail.

Figure 4:
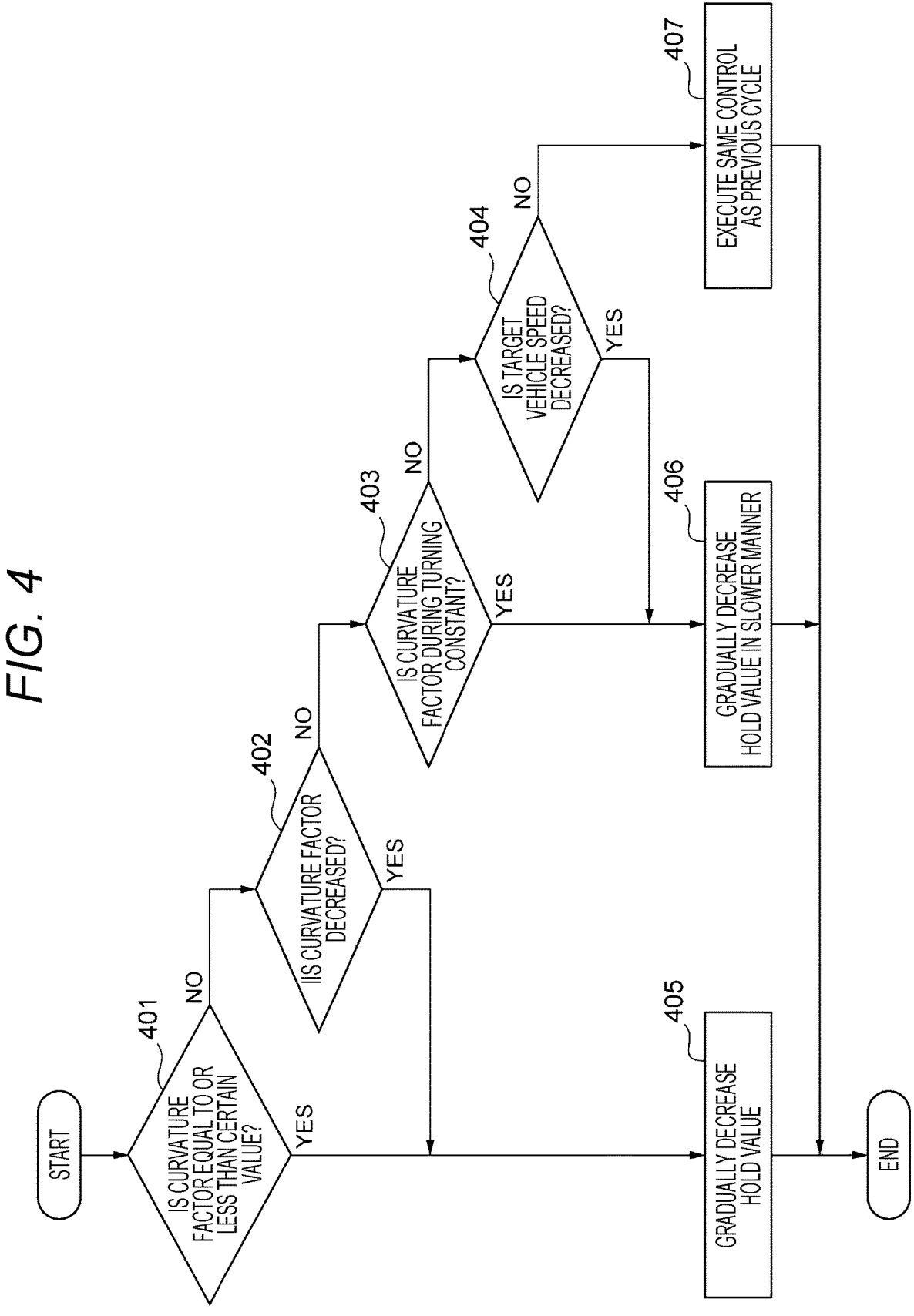
FIG. 4 is a flowchart showing a condition of suppression amount gradual decrease processing.

FIG. 4 is a flowchart showing the contents of the suppression amount gradual decrease processing illustrated in S304 of FIG. 3. The gradual decrease processing is a part for selecting a gradual decreasing speed according to the situation, and the present embodiment is as follows. S401 to S404 are release conditions for gradually decreasing the suppression amount to release the suppression control of the target vehicle speed.

When the curvature factor of the target trajectory is equal to or less than a certain value (YES in S401) or when the curvature factor decreases (YES in S402), the vehicle is not turning or escapes from the turning, and the possibility that the vehicle deviates from the target trajectory or the possibility that the vehicle deviates from the target trajectory again is low. Therefore, it is determined that suppression of the target vehicle speed is unnecessary, and the processing of gradually decreasing the hold value Sh is performed (S405). That is, when the curvature factor of the target trajectory is equal to or less than a certain value, or when the curvature factor of the target trajectory gradually decreases as the target trajectory shifts in the traveling direction of the vehicle, the gradual decrease processing of decreasing the hold value Sh of the suppression amount at a first speed is performed. The gradual decrease of the hold value Sh is performed using the gradual decrease amount calculated by the gradual decrease amount calculation unit 206, and the hold value Sh is decreased at a predetermined first speed.

On the other hand, when the curvature factor of the vehicle during turning is constant (YES in S403) or the target vehicle speed decreases (YES in S404), the possibility that the vehicle deviates from the target trajectory or the possibility that the vehicle deviates again from the target trajectory is low, although not as much as the conditions in S401 and S402, and thus processing of gradually decreasing the hold value Sh at a second speed milder than S405 is performed (S406). That is, when the curvature factor of the vehicle during turning is constant or when the target vehicle speed decreases by a predetermined value or more due to the suppression of the target vehicle speed, the processing of decreasing the hold value of the suppression amount at the second speed slower than the first speed is performed.

As a result, the vehicle is accelerated more slowly as compared to S405, and the hold value Sh is gradually decreased while safety is ensured by observing a state of the deviation amount, thereby reducing uncomfortable feeling of the passenger. Regarding the first speed in S405 and the second speed in S406, a rate of gradually decreasing the hold value by the second speed in S406 is lower than that by the first speed in S405, and the second speed in S406 is set to decrease the hold value Sh at a slower rate.

While the condition of S302 is no longer satisfied but the conditions of S401 to S404 are not satisfied (NO in S404), it is determined that there is a possibility of re-deviation, and the re-deviation is suppressed by continuing to hold the suppression amount (S407). That is, when the curvature factor of the target trajectory is larger than a certain value (NO in S401), the curvature factor of the target trajectory does not decrease (NO in S402), the curvature factor during turning of the vehicle increases (NO in S403), and the target vehicle speed does not decrease by the predetermined value or more due to the suppression of the target vehicle speed (NO in S404), the processing of continuing the suppression of the target vehicle speed using the hold value Sh (S407) is performed.

Figure 5:
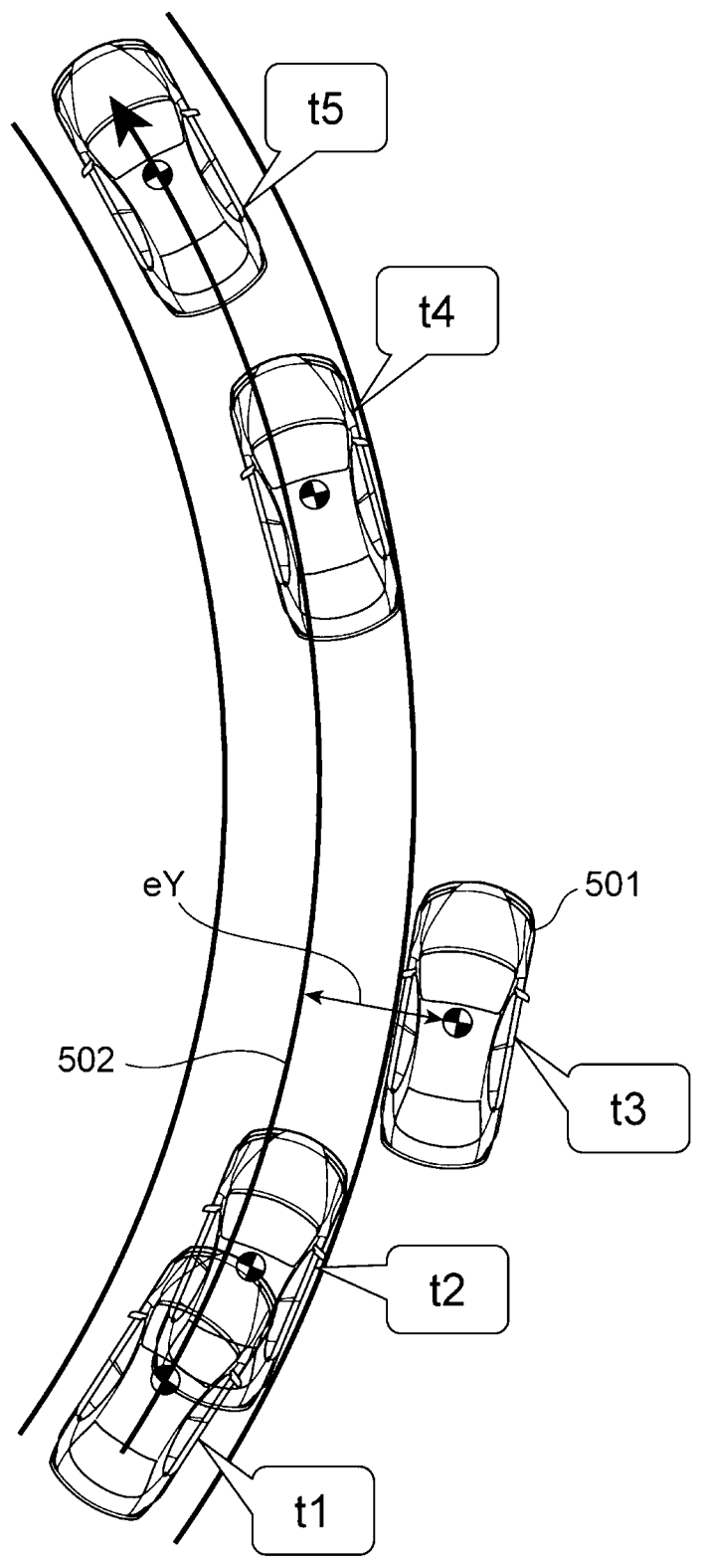
FIG. 5 is a diagram illustrating an example in which a vehicle deviates from a target trajectory.
Figure 6:
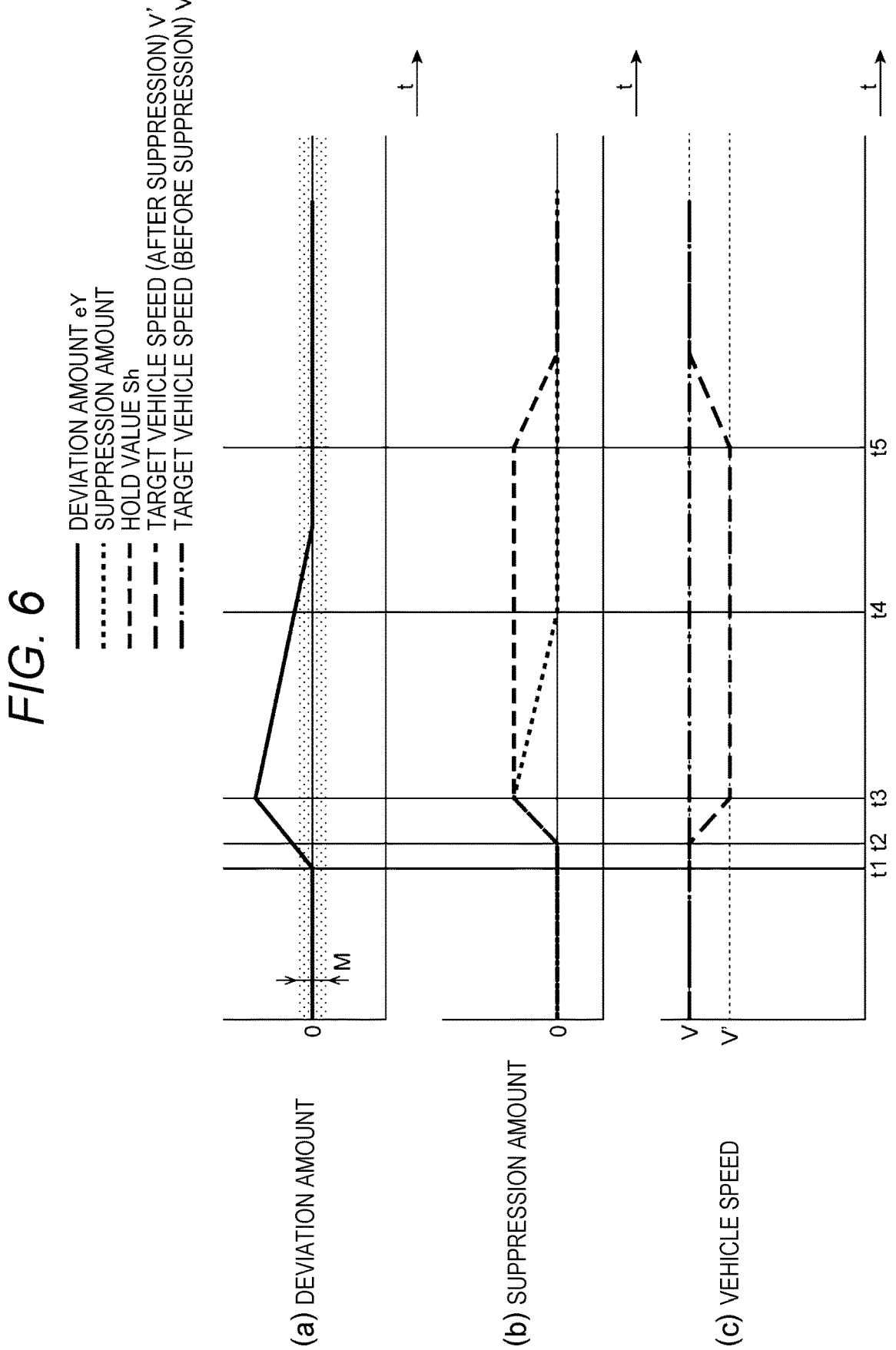
FIG. 6 is a time chart showing an operation example in the present embodiment.

FIG. 5 is a diagram illustrating an example in which the vehicle deviates from the target trajectory, and FIG. 6 is a time chart showing an operation example in the present embodiment.

FIGS. 5 and 6 illustrate, as a basic operation in the present embodiment, a case where a vehicle 501 given a constant target vehicle speed deviates from a target trajectory 502 due to a traveling position deviated to the outside of turning due to disturbance during turning, and returns to the target trajectory 502 by suppression control of the target vehicle speed.

The vehicle control system causes the vehicle 501 to travel along the target trajectory 502 at a target vehicle speed. When the condition that the turning radius of the target trajectory is smaller than the turning determination threshold N is satisfied (YES in S301), as indicated by t1 and t2 in FIG. 5, the vehicle 501 deviates from the target trajectory 502 due to the disturbance, and the traveling position starts to change outward of the turning. When the deviation amount eY exceeds the deviation determination threshold M of the dead zone provided as an allowable value, the control necessity determination unit 202 determines that control is necessary, the determination in S302 illustrated in the flowchart of FIG. 3 is YES, and the processing of holding the suppression amount starts in S303.

Then, the suppression amount holding unit 204 holds, as the hold value Sh, a value (the suppression amount S) calculated by using Expression (5) in FIG. 13 based on the normative vehicle speed calculated by using Expression (3) in FIG. 11 and Expression (4) in FIG. 12. That is, the normative vehicle speed is calculated by the normative vehicle speed calculation unit 201, the suppression amount S is calculated by the suppression amount calculation unit 203 using the normative vehicle speed and the target vehicle speed, and the suppression amount S is held as the hold value Sh by the suppression amount holding unit 204.

Then, as indicated by t2 and t3 in FIGS. 5 and 6, when the vehicle 501 is affected by the disturbance and the deviation amount eY further increases, during that time, the suppression amount S also increases according to the deviation amount eY, and the hold value Sh of the suppression amount S also increases according to the increase in the suppression amount S. Then, the suppression amount S is subtracted from the target vehicle speed $VSP_{tgt}$, and decreases from a value V before the suppression to a value V' after the suppression.

Further, as indicated by t3 and t4 in FIG. 5, the vehicle 501 performs control to return to the target trajectory 502, but since the deviation amount eY from the target trajectory is larger than the deviation determination threshold M, the determination in S302 shown in the flowchart in FIG. 3 remains YES, and the processing of holding the suppression amount at the hold value Sh is performed in S303. That is, in a state where the deviation amount eY is larger than the deviation determination threshold M, it is not determined to be NO in S302, and the processing does not shift to the suppression amount gradual decrease processing in S304.

Therefore, as illustrated between t3 and t4 in FIG. 6(b), the suppression amount S calculated by the suppression amount calculation unit 203 decreases according to the deviation amount eY, but the hold value Sh is held at the value of the suppression amount S at t3 (maximum value) by the suppression amount holding unit 204. Therefore, the target vehicle speed $VSP_{tgt}$ is also held at the suppressed value V'.

In the state illustrated by t4 of FIG. 5, the deviation amount eY of the vehicle 501 falls within the deviation determination threshold M, and thus the determination in S302 is NO. However, in a case where none of the conditions of S401 to S404 shown in FIG. 4 is satisfied at this point of time, the process proceeds to S407, and the same control as the previous cycle is executed in S407. Therefore, as illustrated between t4 and t5 in FIG. 6, the hold value Sh continues to be held at the maximum value of the suppression amount S, and the target vehicle speed $VSP_{tgt}$ also continues to be held at the suppressed value V'.

Finally, as indicated by t5 in FIG. 5, when the determination in any of S401 to S404 shown in FIG. 4 is YES, it is determined that the possibility of re-deviation of the vehicle 501 is low, the hold value Sh is gradually decreased, and the target vehicle speed is gradually recovered to the target vehicle speed before the suppression.

As described above, since the target vehicle speed $VSP_{tgt}$ is suppressed and reduced by the present control at the time of deviation from the target trajectory 502, the actual vehicle speed and acceleration of the vehicle 501 are suppressed, and the vehicle can quickly return to the target trajectory 502. In particular, since the suppression amount of the target vehicle speed $VSP_{tgt}$ is held at the hold value Sh that is the maximum value, it is possible to appropriately suppress the target vehicle speed $VSP_{tgt}$ and cause the vehicle 501 to quickly return to the target trajectory 502. When the predetermined release conditions S401 to S404 are not satisfied even if the vehicle 501 returns to the target trajectory 502, the suppression amount is kept at the hold value Sh, which is the maximum value, so that it is possible to prevent the vehicle from deviating again after returning to the target trajectory 502.

Figure 7:
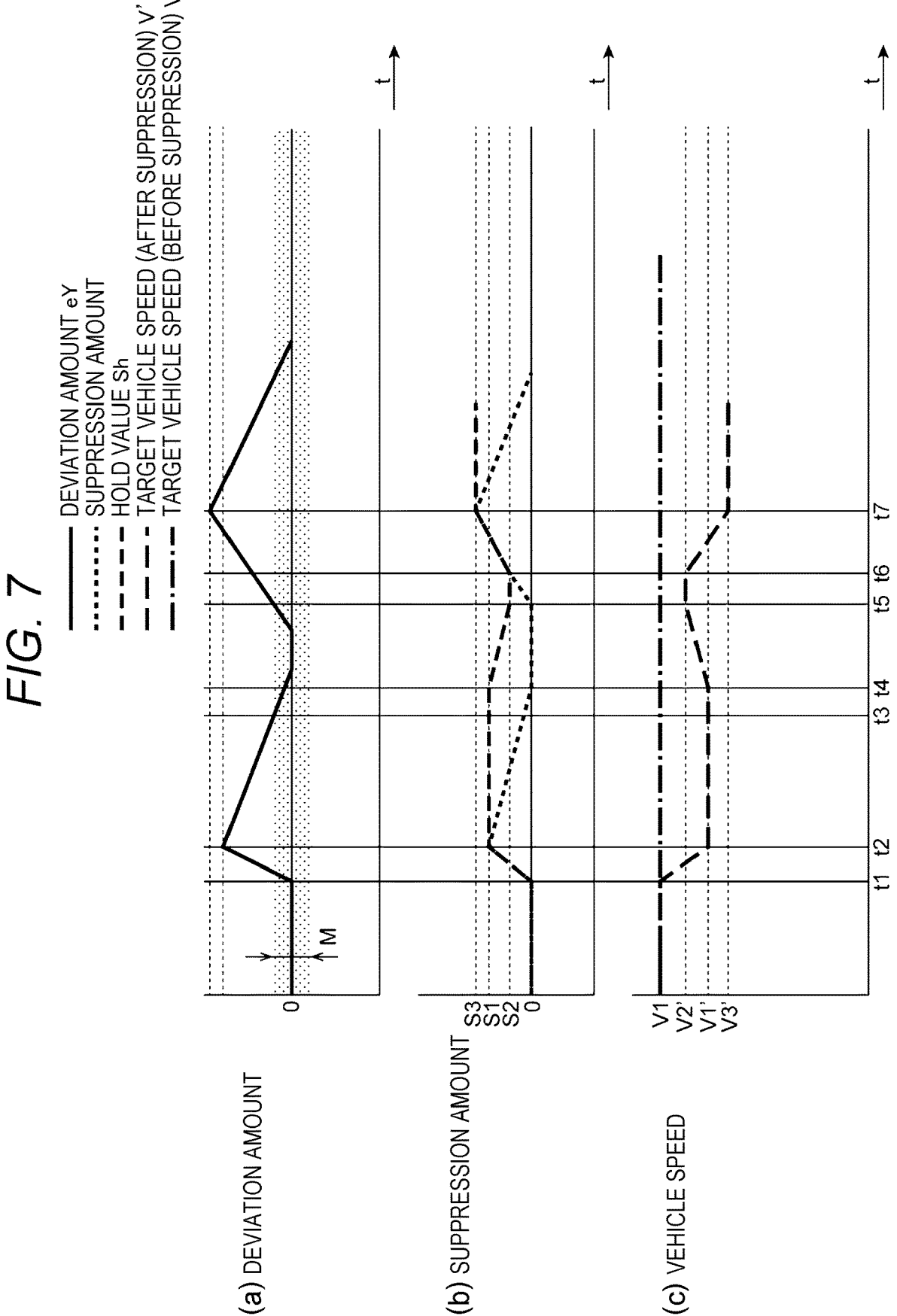
FIG. 7 is a time chart showing another operation example in the present embodiment.

FIG. 7 is a time chart showing another operation example in the present embodiment.

This time chart assumes a case where the vehicle given a constant target vehicle speed deviates from the target trajectory during turning as shown in FIG. 6, and then temporarily returns to the target trajectory, but deviates again due to an influence of further disturbance. When the vehicle deviates from the target trajectory due to disturbance, as illustrated from t1 to t2 in FIG. 7, the suppression amount calculated by the suppression amount calculation unit 203 increases to S1, and the target vehicle speed is suppressed from V1 to V1'. Then, the suppression amount is held at S1 from t2 by the suppression amount holding unit 204, the deviation amount eY falls within the deviation determination threshold M at t3, and the vehicle returns to the target trajectory. Next, at t4, when any of the release conditions of S401 to S404 of FIG. 4 is satisfied, the hold value Sh is gradually decreased from S1, and the target vehicle speed is gradually recovered.

The above described the flow from the deviation to the return is similar to that in FIG. 6, and in FIG. 7, it is assumed that the deviation amount eY turns to increase again during the gradual decrease of the hold value Sh at t5 and the vehicle deviates from the target trajectory again. At this time, the suppression amount S is S2, and the vehicle speed V is V2'.

When the deviation amount eY of the vehicle becomes larger than the deviation determination threshold M at t5, the determination in S302 of FIG. 3 is YES, so that the suppression amount gradual decrease processing in S304 is immediately stopped. Then, as illustrated in FIG. 7, the gradual decrease of the hold value Sh that is being gradually decreased is stopped and held at S2, and the target vehicle speed of the vehicle is held at V2'.

Thereafter, when the suppression amount S calculated by the suppression amount calculation unit 203 increases according to the increase in the deviation amount eY of the vehicle and becomes larger than S2 at t6 (S2<S), the hold value Sh is updated to gradually increase again from t6 to t7, and the target vehicle speed decreases again from V2'. Then, at t7, since the deviation amount eY becomes maximum, S3 of the suppression amount S is held as the hold value Sh.

As described above, when the vehicle deviates again during the gradual decrease of the hold value Sh, the gradual decrease is immediately stopped and the holding of the suppression amount is resumed. Furthermore, in a case where the deviation amount eY increases and the calculated suppression amount exceeds the hold value so far, the time taken to suppress or return the re-deviation of the vehicle is reduced by holding a larger suppression amount.

Figure 8:
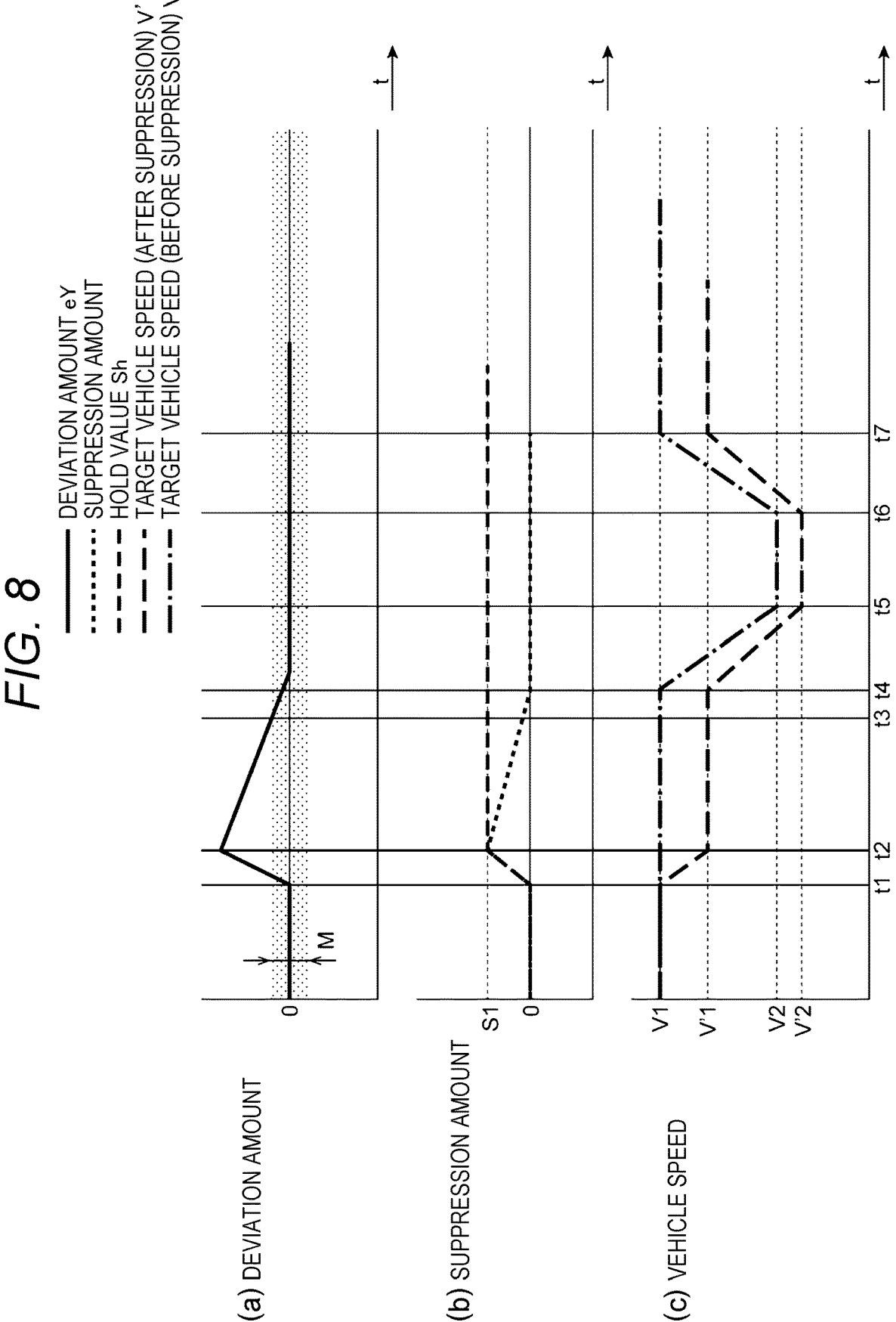
FIG. 8 is a time chart showing still another operation example in the present embodiment.

FIG. 8 is a time chart showing still another operation example in the present embodiment.

This time chart assumes a case where the vehicle given a constant target vehicle speed deviates from the target trajectory during turning as shown in FIG. 6 and then temporarily returns to the target trajectory, but the target vehicle speed changes before the gradual decrease of the hold value starts.

From t1 to t2, the vehicle deviates from the target trajectory, the calculated suppression amount S increases to S1, and the target vehicle speed is suppressed from V1 to V1'. At t3, the deviation amount eY of the vehicle falls within the deviation determination threshold M, and the vehicle returns to the target trajectory.

However, between t4 and t5, the target vehicle speed V decreases from V1 to V2, and the target vehicle speed V' after suppression also decreases from V'1 to V'2. Furthermore, between t6 and t7, the target vehicle speed V increases from V2 to V1, and the target vehicle speed V' after suppression also increases from V'2 to V'1.

At this time, it is assumed that V1=40 km/h and V2=10 km/h. If S1 of the suppression amount S is not a rate but S1=10 km/h, the target vehicle speed V' after suppression decreases from V'1=30 km/h to V'2=0 km/h between t4 and t5, and the vehicle stops. Therefore, when the suppression amount is held in the vehicle speed dimension, it is necessary to perform control to take measures such as subtracting the hold value in accordance with the target vehicle speed in order to avoid stopping of the vehicle and extremely low speed when the target vehicle speed decreases as described above. On the other hand, in a case where the suppression amount is maintained at a rate, when V1=40 km/h and V'1=30 km/h are satisfied, S1=0.25 is satisfied. Therefore, even when V2=10 km/h is satisfied at t5, V'2=7.5 km/h is satisfied, and the vehicle does not stop.

By calculating and holding the suppression amount at a rate as described above, even when the target vehicle speed changes, smooth traveling can be performed without requiring complicated calculation.

In the time charts of FIGS. 6 to 8, after the vehicle deviates and the target vehicle speed is suppressed, it is possible to perform handover processing for ending the autonomous driving at an arbitrary timing and switching the driving subject to the passenger's manual driving. When handover is performed, the vehicle control system holds the suppression amount, continues to suppress the target vehicle speed, notifies the passenger that the autonomous driving is going to end, and switched to the manual driving immediately when the passenger is ready to start driving, and shifts the subject of driving to the passenger.

The vehicle control system of the present embodiment described above determines whether or not the vehicle 501 is in the deviated state in which the vehicle deviates from the target trajectory 502, and when it is determined that the vehicle is in the deviated state, calculates the suppression amount by which the target vehicle speed is decreased based on the deviation amount indicating the deviated state. Then, the maximum value of the suppression amount is held and the target vehicle speed is suppressed using the hold value, and when the vehicle returns from the deviated state to the target trajectory and a preset release condition is satisfied, the hold value of the suppression amount is decreased at a predetermined speed.

According to the vehicle control system of the present embodiment, when the vehicle deviates from the target trajectory, the suppression amount by which the target vehicle speed is decreased is calculated based on the deviation amount. Then, the target vehicle speed is reduced using the suppression amount, and the acceleration and the vehicle speed of the vehicle are suppressed. Further, by holding the suppression amount as a rate to the target vehicle speed, even when the target vehicle speed changes, it is possible to handle the change without requiring complicated calculation, and it is possible to prevent the target vehicle speed from becoming zero.

However, in a case where the suppression is continued as it is, the possibility of deviation is low, and the vehicle speed remains decreased even in a case where the suppression is unnecessary, so that the passenger would feel uncomfortable. Therefore, a condition must be set and the suppression control must be stopped, and at this time, it is assumed that the suppression amount is gradually decreased and the vehicle speed is mildly recovered, instead of turning the suppression control on/off and setting the suppression amount to zero when off. Further, as illustrated in S401 to S404 of FIG. 4, it is assumed that the vehicle speed is safely recovered by setting a plurality of conditions for starting the gradual decrease of the suppression amount, changing the speed of gradual decrease according to each of the conditions, and switching between the first speed in S405 and the second speed in S406.

According to the vehicle control system of the present embodiment, when the vehicle 501 deviates from the target trajectory 502, in order to prompt the vehicle 501 to return to the target trajectory 502, the target vehicle speed can be appropriately reduced, and the target vehicle speed can be continuously suppressed appropriately so that the vehicle may not deviate again after: to the target trajectory. Then, when the possibility that the vehicle deviates again is low, the target vehicle speed is quickly returned to the original speed, and it is possible to prevent excessive acceleration/ deceleration, stopping of the vehicle, and the like when the target vehicle speed changes, so that safety can be ensured without giving a sense of discomfort to a passenger.

Although the embodiments of the present invention have been described in detail above, the present invention is not limited to the above embodiment, and various design changes can be made without departing from the spirit of the present invention described in the claims. For example, the above-described embodiment has been described in detail in order to describe the present invention in an easy-to-understand manner, and it is not necessarily intended to limit to those having all of the described configurations. Further, a part of a configuration of one embodiment can be replaced with a configuration of another embodiment, and a configuration of one embodiment can be added to a configuration of another embodiment. Moreover, it is possible to add, delete, and replace another configuration for a part of the configuration of the embodiment.

REFERENCE SIGNS LIST

11 . . . ECU (vehicle control device)
12 . . . information acquisition unit
13 . . . actuator
109 . . . target vehicle speed suppression amount calculation unit
110 . . . target vehicle speed subtraction unit
201 . . . normative vehicle speed calculation unit
202 . . . control necessity determination unit
203 . . . suppression amount calculation unit
204 . . . suppression amount holding unit
205 . . . suppression amount conversion unit
206 . . . gradual decrease amount calculation unit

The invention claimed is:

1. A vehicle control device that performs control for causing a vehicle to travel along a target trajectory at a target vehicle speed, the vehicle control device comprising at least one processor configured to:

determine whether or not the vehicle is in a deviated state in which the vehicle deviates from the target trajectory;

calculate, when the vehicle is determined to be in the deviated state, a suppression amount by which the target vehicle speed is decreased based on a deviation amount indicating the deviated state;

maintain a hold value of the suppression amount at a maximum value of the suppression amount and suppress the target vehicle speed using the hold value of the suppression amount; and decrease the hold value of the suppression amount at a predetermined speed when the vehicle returns from the deviated state to the target trajectory and a preset release condition is satisfied, wherein, when it is determined that the vehicle is in the deviated state again while the hold value of the suppression amount is decreased at a predetermined speed, the at least one processor is configured to stop a gradual decrease of the hold value of the suppression amount, and maintain the hold value of the suppression amount at the maximum value of the suppression amount.

2. The vehicle control device according to claim 1, wherein the deviation amount is one of a separation distance between the vehicle and the target trajectory and a deviation speed at which the vehicle deviates from the target trajectory.

3. The vehicle control device according to claim 1, wherein the suppression amount is at least one of a speed amount by which the target vehicle speed of the vehicle is decreased and a rate for decreasing the target vehicle speed.

4. The vehicle control device according to claim 1, wherein the at least one processor is configured to:

decrease the hold value of the suppression amount at a first speed when a curvature factor of the target trajectory is equal to or less than a certain value, or when the curvature factor of the target trajectory gradually decreases as the target trajectory shifts in a traveling direction of the vehicle, and decrease the hold value of the suppression amount at a second speed slower than the first speed when the curvature factor of the target trajectory is larger than a certain value and the curvature factor of the target trajectory fails to gradually decrease as the target trajectory shifts in the traveling direction of the vehicle, and also when the curvature factor during turning of the vehicle is constant or when the target vehicle speed decreases by a predetermined value or more due to the suppression of the target vehicle speed.

5. The vehicle control device according to claim 4, wherein the at least one processor continues the suppression of the target vehicle speed using the hold value of the suppression amount when the curvature factor of the target trajectory is larger than a certain value, the curvature factor of the target trajectory fails to decrease, the curvature factor during turning of the vehicle increases, and the target vehicle speed fails to decrease by a predetermined value or more due to the suppression of the target vehicle speed.

6. The vehicle control device according to claim 1, wherein the at least one processor performs handover processing of switching driving of the vehicle from autonomous driving to manual driving after the target vehicle speed is suppressed using the hold value of the suppression amount due to deviation of the vehicle from the target trajectory.

*   *   *   *   *